United States Patent
Alvarez et al.

(10) Patent No.: US 10,989,622 B2
(45) Date of Patent: Apr. 27, 2021

(54) LEAK TEST MACHINE FOR CYLINDER HEAD, ENGINE BLOCK, OR A SIMILAR WORKPIECE

(71) Applicant: ELWEMA Automotive GmbH, Ellwangen (DE)

(72) Inventors: Antonio Alvarez, Stolberg (DE); Eberhard Ilg, Rainau-Saverwang (DE)

(73) Assignee: ELWEMA AUTOMOTIVE GMBH, Ellwangen (DE)

( * ) Notice: Subject to any disclaimer, the term of this patent is extended or adjusted under 35 U.S.C. 154(b) by 116 days.

(21) Appl. No.: 16/062,795

(22) PCT Filed: Dec. 16, 2016

(86) PCT No.: PCT/EP2016/081532
§ 371 (c)(1),
(2) Date: Jun. 15, 2018

(87) PCT Pub. No.: WO2017/103176
PCT Pub. Date: Jun. 22, 2017

(65) Prior Publication Data
US 2020/0200644 A1  Jun. 25, 2020

(30) Foreign Application Priority Data
Dec. 16, 2015 (DE) .................... 20 2015 106 873.5

(51) Int. Cl.
*G01M 3/04* (2006.01)
*G01M 3/32* (2006.01)
(52) U.S. Cl.
CPC .............. *G01M 3/329* (2013.01); *G01M 3/04* (2013.01)

(58) Field of Classification Search
CPC ................................ G01M 3/329; G01M 3/04
(Continued)

(56) References Cited

U.S. PATENT DOCUMENTS 6,578,407 B1   6/2003   McTaggart
8,991,236 B2 * 3/2015   Nandwani ............. G01M 3/329
                                              73/40

(Continued)

FOREIGN PATENT DOCUMENTS

DE   10360143 B4   2/2006
DE   10241368 B4   5/2007

(Continued)

OTHER PUBLICATIONS

Office Action dated Jan. 9, 2020 issued in CN Application No. 201680079107.7 (English Translation Only).

(Continued)

*Primary Examiner* — John Fitzgerald
*Assistant Examiner* — Rodney T Frank
(74) *Attorney, Agent, or Firm* — Panitch Schwarze Belisario & Nadel LLP

(57) ABSTRACT

A flexible leak testing machine for tightness testing of a cylinder head, an engine block or similar workpiece has at least one sealing plate, a machine frame with at least one workpiece holding device for the workpiece and an adjusting device with a first drive for bringing together the workpiece and the sealing plate into a test position. The leak testing machine is flexibly usable in that it includes a changeover device for sealing plates. The changeover device has an adjustable holding arrangement on the machine frame, with sealing plate holders and an associated drive for sealing plate changeover.

29 Claims, 4 Drawing Sheets

(58) Field of Classification Search
USPC .............................................................. 73/40
See application file for complete search history.

(56) References Cited

U.S. PATENT DOCUMENTS

| | | |
|---|---|---|
| 2013/0031961 A1 | 2/2013 | Nandwani et al. |
| 2013/0031962 A1 | 2/2013 | Nandwani et al. |
| 2013/0074584 A1 | 3/2013 | Graham |

FOREIGN PATENT DOCUMENTS

| | | |
|---|---|---|
| DE | 102012213186 A1 | 2/2013 |
| EP | 0122551 A2 | 10/1984 |
| EP | 1014068 B1 | 10/2005 |
| EP | 1333266 B1 | 3/2006 |

OTHER PUBLICATIONS

Int'l Search Report dated Mar. 14, 2017 in Int'l Application No. PCT/EP2016/081532.
English Translation of Int'l Preliminary Report on Patentability dated Jun. 21, 2018 in Int'l Application No. PCT/EP2016/081532.

* cited by examiner

LEAK TEST MACHINE FOR CYLINDER HEAD, ENGINE BLOCK, OR A SIMILAR WORKPIECE

CROSS-REFERENCE TO RELATED APPLICATIONS

This application is a Section 371 of International Application No. PCT/EP2016/081532, filed Dec. 16, 2016, which was published in the German language on June 22 under International Publication No. WO 2017/103176 A1, which claims priority under 35 U.S.C. § 119(b) to German Application No. 20 2015 106 873.5, filed Dec. 16, 2015, the disclosures of which are incorporated herein by reference in their entirety.

BACKGROUND OF THE INVENTION

The invention relates in general to a leak testing machine and a system for tightness testing of a cylinder head, an engine block or a comparable industrially produced, technical workpiece with at least one internal chamber to be tested for tightness. The invention further relates to the use thereof in tightness testing of industrial components and to a method for industrial tightness testing, in particular of metal workpieces made from cast blanks. The terms tightness testing and leak testing are here used synonymously.

In the industrial production of combustion engines, workpieces with a void volume or internal chamber, in particular cylinder head and engine block or crankcase, the various internal chambers are typically tested for leaks in a leak testing machine after machining. Only in this way is it possible to ensure proper functioning of the finished engine, because such workpieces or components, generally manufactured from cast blanks, may exhibit critical production-related leaks in their internal chambers, for example pores or cracks caused by casting defects. A leak in a pressure chamber or internal chamber will cause complete or partial failure of the component under operating pressure. This applies both to the lubricating oil system and in particular also to the more finely branched duct system for cooling liquid. It is advantageous to test every workpiece for tightness of the respective internal chamber prior to further processing or final assembly. This applies in particular in the case of the thin wall thicknesses of workpieces obtained by aluminum die casting (owing to the desire to reduce weight and thereby emissions), but also in conventional production using gray iron casting.

If the cooling system is not leakproof, for example, cooling liquid may enter the combustion chamber or the lubricant circuit. Depending on the extent of the leak, the service life of the engine would be reduced considerably thereby or the engine may be quickly destroyed. Subsequent replacement of a leaking cylinder head or engine block would be unacceptable for cost reasons. It is therefore absolutely essential to remove leaking components and discard them as rejects prior to final assembly of the internal combustion engine or to subject them to repair and retesting. Corresponding tightness testing is the main purpose of a leak testing machine of the type in question.

An older generation of leak testing machine is known from patent application EP 0 122 551 A2. This leak testing machine for tightness testing of a cylinder head has a sealing plate with a sealing arrangement matching the connection region of the cylinder head open on the engine block side, a machine frame with at least one workpiece holding device on a horizontally swivelable frame and an adjusting device therefor. The adjusting device has pneumatic cylinders as drives for clamping or pressing on workpiece and sealing plate in a test position. In the test position, the workpiece lies with its connection region tight against the sealing arrangement of the sealing plate and is pressurized with compressed air for testing purposes. The design according to EP 0 122 551 A2 is unsuitable for fully automated manufacture, however.

A partially automated testing system, specifically for short runs, is described in patent DE 103 60 143 B4. Patent DE 102 41 368 B4 describes a leak test for a crankcase, specifically a divided crankcase.

A leak testing machine of the type in question and a newer generation, fully automated tightness testing system are anticipated by patent EP 1 333 266 B1, which represents the closest prior art. The leak testing machine according to EP 1 333 266 B1 is suitable for a cylinder head, an engine block or a similar industrially produced workpiece with an internal chamber to be tested for tightness. It has a lower sealing plate and sealing plungers swiveled laterally and from above, in each case with a sealing arrangement matching the open connection region of the workpiece to be sealed. A further component is connected to the connection region in the finished state. A displaceably mounted workpiece holding device is provided on the machine frame. An adjusting device for bringing together workpiece and sealing plate comprises inter alia a lifting means with lifting cylinders for raising the lower sealing plate against the workpiece and further drives for the sealing plungers. The adjusting device thus adjusts sealing plate and plungers into a test position, in which the workpiece rests with its connection region in sealing manner against the sealing arrangement of the sealing plate.

For increased availability and a simultaneous reduction in avoidable waste, the system according to EP 1 333 266 B1 provides at least two identical leak testing machines respectively for each workpiece type. The second machine tests redundantly. This serves to confirm a leak or indeed for maintenance of the sealing arrangement on the machine displaying a fault, if just one of two tests is negative. To increase system availability, when one machine with a defective seal is undergoing maintenance, a third identical machine may be brought into operation.

Patent EP 1 333 266 B1 further proposes use in the system of an appropriate leak testing machine for each workpiece type, as corresponds to the current state of the art. To implement the invention therein, however, it would be necessary to provide a set of redundant leak testing machines for each workpiece type, i.e. at least two, preferably three leak testing machines for each workpiece type.

In the case, in particular, of highly flexible manufacturing systems, which are being used ever more widely, a considerable number of leak testing machines dependent on workpiece type and thus engine are required to manufacture for example different mass-produced engines and variants thereof without restrictions or time-consuming retooling. The same is also true where highly flexible manufacture is not used, for example where it is intended to produce "modular engines", in the form, as necessary, of three-, four- and six-cylinder in-line engines, on one and the same production line without retooling. This is associated with correspondingly complex production, installation, control, maintenance, etc. and large footprints.

It is therefore an aim of the present invention to provide a tightness testing solution for multiple different workpiece types with reduced complexity, in particular with lower production costs, in particular for different designs of the same type, such as for example the cylinder head type or the engine block or crankcase type.

A further object involves providing an improved system and method for highly flexible manufacture.

BRIEF SUMMARY OF THE INVENTION

A leak testing machine of the type in question is intended for tightness testing of a cylinder head, an engine block or a similar industrially produced workpiece with at least one or more internal chambers or pressure chambers to be tested for leaks. The term machine is in this case in particular understood to mean an apparatus which may be used separately or as a unit, as required, and which typically corresponds to an individual system station. The leak testing machine comprises at least one sealing plate or sealing unit with a sealing arrangement matching the workpiece to be tested. At least one workpiece-holding device is provided for the workpiece on the machine frame (sum of the load-bearing parts) of the leak testing machine. The holding device may be mounted in stationary or mobile manner on the machine frame.

The leak testing machine has an adjusting device with at least one first drive for bringing together (advancing) workpiece and sealing plate into a test position. This proceeds by relative motion of just one part or both parts toward one another. In the test position, the workpiece lies with its connection region tight against the sealing arrangement of the sealing plate, so that tightness testing of an internal chamber may be performed. The term sealing plate should be understood functionally as meaning a sealing unit, optionally also without base plate, for temporary gas-tight closure of an outwardly open connection region relative to an internal chamber. The sealing plate is a closure used purely for testing purposes and of a configuration dependent on or adapted to that of the workpiece.

To achieve the former object, the invention provides, in its simplest embodiment, equipping the leak testing machine with an integrated sealing plate changeover device (an "integrated sealing plate changer", as it were) for exchanging a sealing plate usable in the test position, which device may be equipped with at least two sealing plates.

To this end, a holding arrangement mounted adjustably on the machine frame may be provided according to the invention which comprises at least two holders to be equipped in each case with one sealing plate and at least one second drive associated with the changeover device. This makes it possible, as required, to bring a holder with sealing plate out of a waiting position into an operating position and vice versa, i.e. to bring this holder with sealing plate out of the operating position into the waiting position. In this case, the operating position is associated with the test position, i.e. is identical or corresponds thereto or faces it (is proximal thereto), depending on whether and optionally how the sealing plate is moved by the adjusting device. The waiting position of the or each sealing plate or holder not in the operating position may be facing away or remote from (distal from) the test position and is in any case different from the operating position. Possible drives are electromechanical, pneumatic or hydraulic drives, operating directly or via a transmission. The changeover device preferably has at least one drive with an electrical servomotor or stepping motor.

When operationally ready, the leak testing machine is equipped with at least two interchangeable sealing plates on the holding arrangement, so that rapid changeover may be completed, optionally fully automatically, using the changeover device.

For instance, one and the same leak testing machine may be used without retooling for at least two, preferably for a plurality of workpiece types. The concept according to the invention thus reduces production complexity and is of compact structure, i.e. also reduces the footprint needed. A dedicated machine for each type is no longer needed. The integrated changeover device allows increased modularity and flexibility with regard to the components to be tested, despite a reduction in total costs. The solution according to the invention not only simplifies retrofitting or retooling in the event of workpiece modification, for example in the case of further development of the engine to be manufactured, but also in this respect allows mixed pilot and mass production of multiple variants or generations of a workpiece without interruption for retooling.

It is optionally possible, without additional effort, to avoid downtime during sealing plate maintenance, by bringing an identical reserve sealing plate into operation without interruption.

The invention is based on the surprisingly simple recognition that the limited additional expenditure on a machine associated with additional components for providing a sealing plate changeover device enables a reduction in system costs which far outweighs this additional expenditure due to repeated use of the other components of the leak testing machine. As a result of integrated sealing plate changeover, not only are system components used repeatedly but operations are also combined. The invention allows a leaner system design as a whole due to the reduction in number of testing stations. Expenditure on electrical engineering and information technology, for example software and hardware for system control, robotics and optionally also conveying technology is thus also reduced. Basic energy consumption is also reduced. In a system with a plurality of machines with n-fold changeover devices, the savings made may approximate to the factor n.

The proposed leak testing machine is suitable in general for individual parts of internal combustion engines and specifically for the components of diesel and gasoline engines, in particular for testing a cylinder head, an engine block or a crankcase. The machine or system equipped therewith is, moreover, particularly suitable for production lines for highly flexible, networked production and optionally for "chaotic" production. It goes without saying that multiple such leak testing machines may be used in one system, wherein the system may for example test up to eight different workpiece types with just two machines and a 4-fold sealing plate changer, whereas hitherto a system with eight individual machines would have been needed. It is optionally also possible to test different pressure chambers of one workpiece type with less effort using the changeover device, if the task could not be completed with just one sealing plate.

In one preferred embodiment, the holding arrangement has a common supporting member, for example of the base plate type, on which the at least two, preferably four, holders are provided and which is mounted adjustably on the machine frame. The changeover device may thus be actuated with just one second drive. The common supporting member is a carrier- or retainer-like structure which may be in one piece or of the multipart type. Alternatively, in the absence of a common supporting member, it would be necessary for the holding arrangement to comprise a holder for each sealing plate which could be independently adjustably mounted on the machine frame, but this would require multiple drives or a complex variable speed gearbox. The holders act in each case as retainers for precisely one sealing plate and may in this respect have any suitable design for mounting the sealing plate and optionally removably retaining it. Removal of the sealing plate from its holder for feeding into the operating position is possible but not essential.

In one further development with a common supporting member, the latter is mounted swivelably on the machine frame, in particular swivelably about a vertical axis. In this way, each sealing plate may be brought into the operating position or removed therefrom on the corresponding holder in the manner of a rotary table, carrousel or turret by swiveling about the axis. In this way, a plurality of holders may be accommodated. A linearly or curvilinearly driven holding arrangement is also conceivable for sealing plate exchange. In the case of a vertical swivel axis, the sealing plate may in particular be fed vertically from above or below to the workpiece, which permits a compact construction.

In one preferred configuration, the swivelable supporting member has four or more holders each for one sealing plate distributed about the circumference, in particular with identical angular spacing. It is also possible, especially but not solely in conjunction with a carrousel-like, swivelable supporting member, to provide a plurality of holders in compact arrangement, for example in a star-shaped or polygonal distribution.

In accordance with another aspect, which is in itself independent of the above way of achieving the object, a leak testing machine of the type in question may be optimized merely by mounting a rotary indexing table on the machine frame which has at least one, preferably two or more workpiece holders and a dedicated associated drive. The rotary indexing table may move the workpiece from a loading position into a home position upstream of the test position, or directly into the test position and vice versa. In this case, a separate loading position serves in loading and unloading of the leak testing machine. A further workpiece may therefore be taken into or out of the leak testing machine while a previously loaded workpiece is still undergoing tightness testing. This allows shorter cycle times and higher productivity to be achieved. Rotary indexing tables are here generally also understood to mean rotary tables or rotary switching tables. Such rotary devices allow indexed and/or continuous component movement on a circular trajectory. The indexing in angular increments (i.e. not free positioning) which is preferred here is achieved in this case using the leak testing machine controller and for example with a rotary encoder on the drive. In principle, a rotary indexing table with just two holding devices offset by 180° each for one workpiece is sufficient.

This further development is considered of significance to the invention if taken alone, but is also advantageous in combination with the changeover device, since during exchange of the newly loaded and already tested workpieces by the rotary indexing table the sealing plates may be changed at the same time without appreciable loss of time.

As an alternative to a rotary indexing table, a robot with double gripper is also feasible for direct loading, wherein one gripper holds the workpiece to be loaded and the other is free for removal, so as to permit unloading and loading of the machine in a short time.

A particularly compact design with rotary indexing table and sealing plate changer may be achieved if the supporting member is mounted swivelably on the machine frame coaxially to the axis of rotation of the rotary indexing table. The design is particularly simple if the supporting member is mounted swivelably directly on the rotary indexing table, in particular the frame thereof. The rotary indexing table may take the form of a conventional commercial system component. A precise and robust design with regard to the sometimes considerable weights involved may be achieved if the rotary indexing table has a vertical axis of rotation and a central bracket actuated by the drive thereof, rotatable about said axis, and extending vertically in a manner similar to a retaining column. The at least two opposing workpiece holding devices may be attached, optionally also adjustably, to the central bracket.

The workpiece holding device may in this case be of modular construction and take the form of an indirect retainer for an adapter support accommodating the workpiece. Using suitable adapter supports, different workpiece types, in particular of the same type but for another series, for example engine blocks for 3-, 4- and 6-cylinder in-line engines, may be handled uniformly and in modular manner across the system. In this respect, the leak testing machine is also inherently suitable for accommodating or handling different workpiece types.

The workpiece holding device may be embodied in any manner suitable for automation, i.e. passive in the manner of a receptacle or active with actuating means, for example in the form of a gripper, suction holder, etc.

Irrespective of how the machine is loaded but in particular when the rotary indexing table with vertical central bracket is used, the adjusting device in the form of a vertical lifting device may have a vertical linear guide for each workpiece holding device, for example on the central bracket, and comprise as first drive a lifting drive for advancing a workpiece holding device with workpiece from a home position into the test position and/or for pressing the workpiece against an advanced sealing plate. The sealing plate may here optionally have just the degree of freedom of the changer, i.e. the workpiece alone is fed to the sealing plate. The sealing plate may alternatively be mounted movably on the holder or movably therewith with a further degree of freedom for advance from the operating position into a test position.

In a preferred embodiment, in the case of at least one changeover device (cf. below) each holder has a detachable sealing plate adapter, which may be held in particular vertically detachably. This enables a uniform interface between all sealing plates and the further parts of the changeover device. Each sealing plate may then be attached to the holder by means of sealing plate adapters. The sealing plate is preferably locked to the adapter. Each sealing plate adapter may in turn interact in modular manner and with a uniform interface with the adjusting device, in particular a further lifting drive. Thus, a sealing plate together with sealing plate adapter may be fed out of the operating position (or an upstream ready position) into the test position and/or pressing of this sealing plate against the workpiece may take place.

In terms of drives, hydraulic cylinders in the form of lifting drives are preferred for the adjusting device, and an electric servomotor or stepping motor, connected to a system controller, for actuating the supporting member, preferably via a transmission, is preferred for the second drive stated as associated with the changeover device. The electric motor may in particular drive a toothed belt via a worm gear pair, said toothed belt interacting with a circumferential ring gear on the supporting member. As with a rotary indexing table, spur gears, disk cam gears, or—for the preferably fixedly specified n angular steps for n exchangeable sealing units—Geneva gearing are also possible options.

Especially for tightness testing of an engine block, a crankcase or other component, in particular for engine manufacture, with two connection regions remote from one another, it is advantageous for the leak testing machine to comprise one sealing plate respectively for each of the two connection regions of the workpiece, i.e. a set of two sealing plates. Accordingly, the leak testing machine in this case preferably also has two integrated changeover devices for sealing plates. These may be arranged in such a way that the sealing plates face one another relative to an accommodated workpiece and may clasp the workpiece in the manner of a sandwich. To this end, one changeover device may in particular be arranged on the machine frame beneath the workpiece holding device and the further changeover device on the machine frame above the workpiece holding device. Especially in conjunction with an arrangement with supporting members mounted in the manner of a rotary table, a compact structure with a small footprint may be achieved despite the changeover devices.

For a compact design with two sealing plate changers, it is favorable for the lower sealing plate to be guided vertically from below by a lifting device from its operating position, optionally together with the vertically guided workpiece, to the upper sealing plate which is vertically immobile and pressed thereagainst. To this end, the supporting member swivelable in the manner of a carrousel is also advantageous for both changers. The changeover devices may in each case have a dedicated drive or a common drive for synchronous running.

The second changeover device may be embodied largely similarly to the first in terms of structure. It may comprise a further holding arrangement mounted adjustably on the machine frame with at least two or more holders in each case for one sealing plate and with an associated dedicated or fourth drive. The second sealing plate changer also serves to bring a holder with sealing plate out of a waiting position into an operating position associated with the test position and vice versa. In one practical arrangement, in the operating position the further holding arrangement will hold the second sealing plate in the second changer opposite the first sealing plate on the first changer.

Each changeover device is preferably equipped with at least two different sealing plates corresponding to two workpiece types, wherein the changeover device is preferably provided to be equipped with four or more sealing plates.

Accordingly, each holding arrangement may comprise two, three or in particular four or more holders in each case for one sealing plate, which are for example uniformly distributed or arranged with an angular offset around the swivel axis.

The sealing plate is configured specifically to match the connection region of the workpiece. In this respect, it may for example comprise an arrangement as a unit of advanceable seals, sealing plungers, or the like or have a more complex structure with integrated pressing device (for example according to utility model DE 202 16 543 U1).

To avoid operating errors and damage, it is advantageous for each holder to have one-to-one incorrect coupling prevention means, i.e. such means specifically matched to just one sealing plate type. To this end, a coding pin/receptacle combination with a sealing plate adapter may in particular be provided or an equivalent locking safeguard, which respectively allows only one sealing plate type or only one specific adapter to be fitted to a specific holder. Incorrect coupling prevention means may likewise also be provided between sealing plate adapter and the sealing plate itself.

In one typical embodiment, each sealing plate has a base plate with sealing arrangement. At least one test connection for a testing device to be connected in gas-tight manner with the internal chamber of the workpiece may moreover be provided on each sealing plate of the changer. The testing device is connected by lines to the testing connection for measurement of differential pressure or volumetric flow rate and pressurizes the internal chamber to be tested. Where possible, however, the testing connection is not arranged on the sealing plates of the changer, but rather separately, for example on an additional sealing plunger or the like.

In a conventional design, in addition to the sealing plate(s) provision is made, if required, of sealing plungers typically advanceable transversely of the direction of action of the adjusting device, in particular obliquely and/or laterally, to the workpiece or of smaller sealing plates for further openings to the internal chamber of the workpiece to be sealed for testing purposes. These are arranged on the machine frame in such a way as to be automatically actuatable by corresponding feed mechanisms and/or feed drives, for example driven pneumatically and linearly displaceably.

In conjunction with one changeover device, in particular in the case of two changeover devices, the machine may be of smaller size if the further sealing plungers or additional sealing plates are movable out of the travel area of the changeover device(s) into a parked position and back into an operational position.

The invention also further relates to a system for partly or fully automated tightness testing for industrially produced workpieces with an internal chamber to be tested, in particular for cylinder heads or engine blocks, with at least one leak testing machine, in particular with a plurality of leak testing machines, according to one of the above-described embodiments. The savings that can be made and the production flexibility scale with the number of machines used which have multiple sealing plate changers according to the invention.

To increase the degree of automation, the system or machine controller should be configured such that it controls each changeover device (on each leak testing machine), in particular the drive thereof, to bring a sealing plate matching the workpiece automatically into the operating position.

To this end, the system controller is advantageously connected with a recognition device for recognizing the type of the next workpiece to be loaded. Accordingly, the changeover device is controlled as a function of workpiece recognition and brings the respectively matching sealing plate automatically into the operating position.

The changeover device itself preferably has one or more sensing devices, for example position measuring devices for feeding back the current position of the holding arrangement, via which the controller detects the setting of the changeover device with regard to the sealing plate located in the operating position. For sealing plate positioning, the controller has a closed control loop or an open control chain.

A fully automated system has an industrial robot for automatic workpiece handling, including loading and unloading of the workpiece holding device(s) with a workpiece. The industrial robot is preferably controlled by the system controller, which also controls the changeover device(s).

For further automation, a computer-assisted measuring device for measuring differential pressure or volumetric flow rate may be provided as a testing device, which may likewise be integrated into the system controller for automated tightness testing.

To increase the degree of automation, the system controller controls both the sealing plate changer and also, for the purpose of fully automated tightness testing, the measuring device and/or, for fully automated workpiece handling, the industrial robot and is accordingly connected with these system components.

The invention also relates to the industrial use of a leak testing machine or a system according to one of the above-described exemplary embodiments for the purpose of tightness testing an industrially produced workpiece with an internal chamber to be tested, in particular a cylinder head or an engine block. As well as flexibility in terms of workpiece, said use may preferably encompass the fact that the changeover device brings a sealing plate identified as defective or as needing to be exchanged from the operating position into the waiting position or into a separate maintenance position. Identification may in this case be based on the test results or on predictive maintenance data. At the same time, a reserve sealing plate already fitted to a holder of the changer may be brought into operational readiness or into operation. Thus, the changeover device may also be utilized or used to reduce maintenance-related downtime.

The invention finally also relates to a method for industrial tightness testing with automatic sealing plate changeover. In this respect, a leak testing machine is loaded with a workpiece to be tested in the form of a cylinder head, an engine block or the like. The workpiece and a sealing plate are suitably advanced or brought together into a test position, in which the workpiece lies with the connection region tight against a sealing arrangement of the sealing plate and is tested using a suitable measuring device.

A method according to the invention is distinguished by automatic changeover of the sealing plate using a changeover device integrated into the leak testing machine and having at least two sealing plates, wherein, prior to bringing together workpiece and sealing plate into the test position, the leak testing machine, as required, brings a sealing plate matching the workpiece from a waiting position into an operating position associated with the test position, if the matching sealing plate is not already in the operating position. Changeover may in particular proceed automatically, for example assisted by a system controller with workpiece recognition.

Further preferred aspects of the use and method may be inferred from the features described further above.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
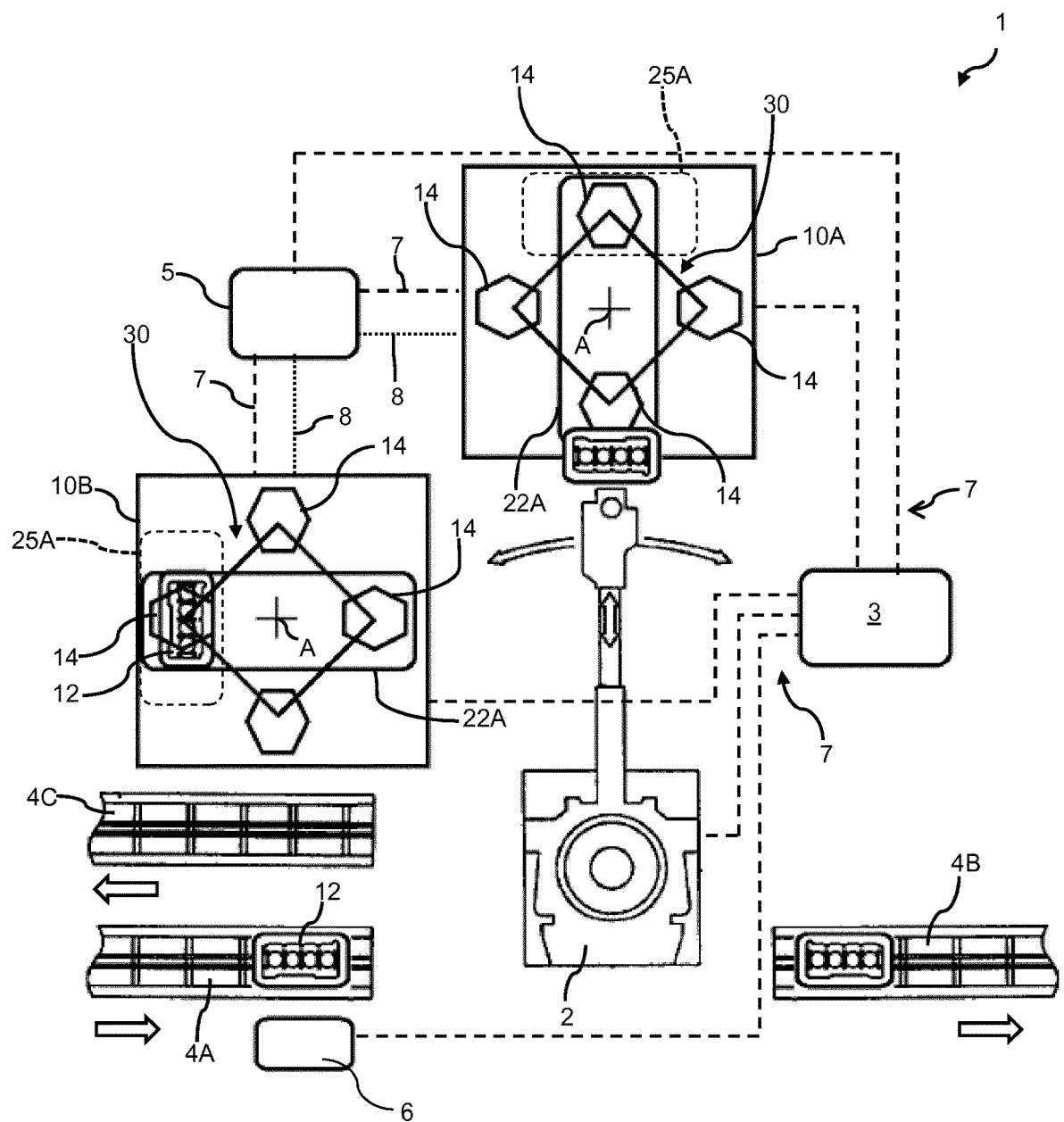
FIG. 1 is a schematic diagram of a system with two leak testing machines for fully automated tightness testing of workpieces, here of engine blocks, an industrial robot and a block circuit diagram of the system controller.

FIG. 1 shows a system, denoted overall with reference sign 1, with an industrial robot 2 controlled via a system controller 3. The industrial robot 2 is connected to this end via a field bus or industrial bus 7 to the system controller 3, for transmission of control and information signals. The system 1 serves in fully automated tightness testing of workpieces, in FIG. 1 for example of engine blocks 12.

To this end, the industrial robot 2 removes the engine blocks 12 individually from a conveying path 4A arriving from the upstream stages of a production line and passes them to one of a number of leak testing machines 10A, 10B (two shown here, merely by way of example). The leak testing machines 10A, 10B each have a workpiece holding device 22A in the working zone of the industrial robot 2, so that they can be loaded by the latter with a workpiece. The workpiece holding device 22A brings the engine block 12 suitably into a test position 25A. Each leak testing machine 10A, 10B is connected with a dedicated or joint, computer-assisted testing or measuring instrument 5 of per se known design in each case via a hose line 8. Using the measuring instrument 5, a sealing plate (here schematically designated 14) respectively matching the engine block 12, is supplied for the purpose of the leak test or tightness testing. Any test method known to a person skilled in the art may be used for the leak test, for example measurement of differential pressure or volumetric flow rate, which enables testing for leaks in the relevant pressure or internal chambers of the engine block 12.

A workpiece code reader 6 for identifying an optically readable code (for example QR code or barcode or the like), which is provided for identification purposes on the engine block 12, and for transmitting type and optionally identification data is connected to the system controller 3 via the industrial bus 7. The system controller 3 uses the data and may process or forward it for example for quality assurance purposes. The system controller 3 records the test result corresponding to each engine block 12 from the respective leak testing machine 10A, 10B. Once a leak test has been completed, the industrial robot 2 removes the tested engine block 12 from the respective leak testing machine 10A, B. In the case of a successful or positive test result, the tested engine block 12 is passed on by the industrial robot 2 to a further conveying path 4B, in particular for further assembly, for example for completing the engine. In the case of a negative test result, the industrial robot 2 passes the defective engine block 12 to another outgoing conveying path 4C, for repair or disposal.

According to the invention, each of the leak testing machines 10A, 10B has an integrated and automated changeover device 30, shown merely schematically in FIG. 1, for exchange, if required, of the sealing plate 14 used in a test position 25A for tightness testing of the engine block 12. For instance, the sealing plate 14 may be selected or exchanged fully automatically by the system controller 3 as a function of the engine block 12 to be tested, i.e. flexible leak testing is enabled on one and the same machine. For this purpose, the changeover device 30 has a holding arrangement with a corresponding number of holders for the sealing plates 14, which is described in detail further below by way of example. In the example shown, the holding arrangement of the changeover device 30 is swivelable about a vertical axis A (perpendicular to the plane of FIG. 1) in the manner of a carrousel. To this end, the changeover device 30 cooperates via the system controller 3 with the workpiece code reader 6 provided on the incoming conveying path 4A. Using the workpiece code reader 6, the system controller 3 identifies the workpiece type of the engine block 12 to be tested and adjusts the respective flexible leak testing machines 10A, 10B accordingly in such a way that the matching sealing plate 14 is brought fully automatically into the test position 25A.

In the example according to FIG. 1, the leak testing machines 10A, 10B have just one changeover device 30. For specific workpiece types, however, two changeover devices may be provided in the flexible leak testing machine.

Figure 2A:
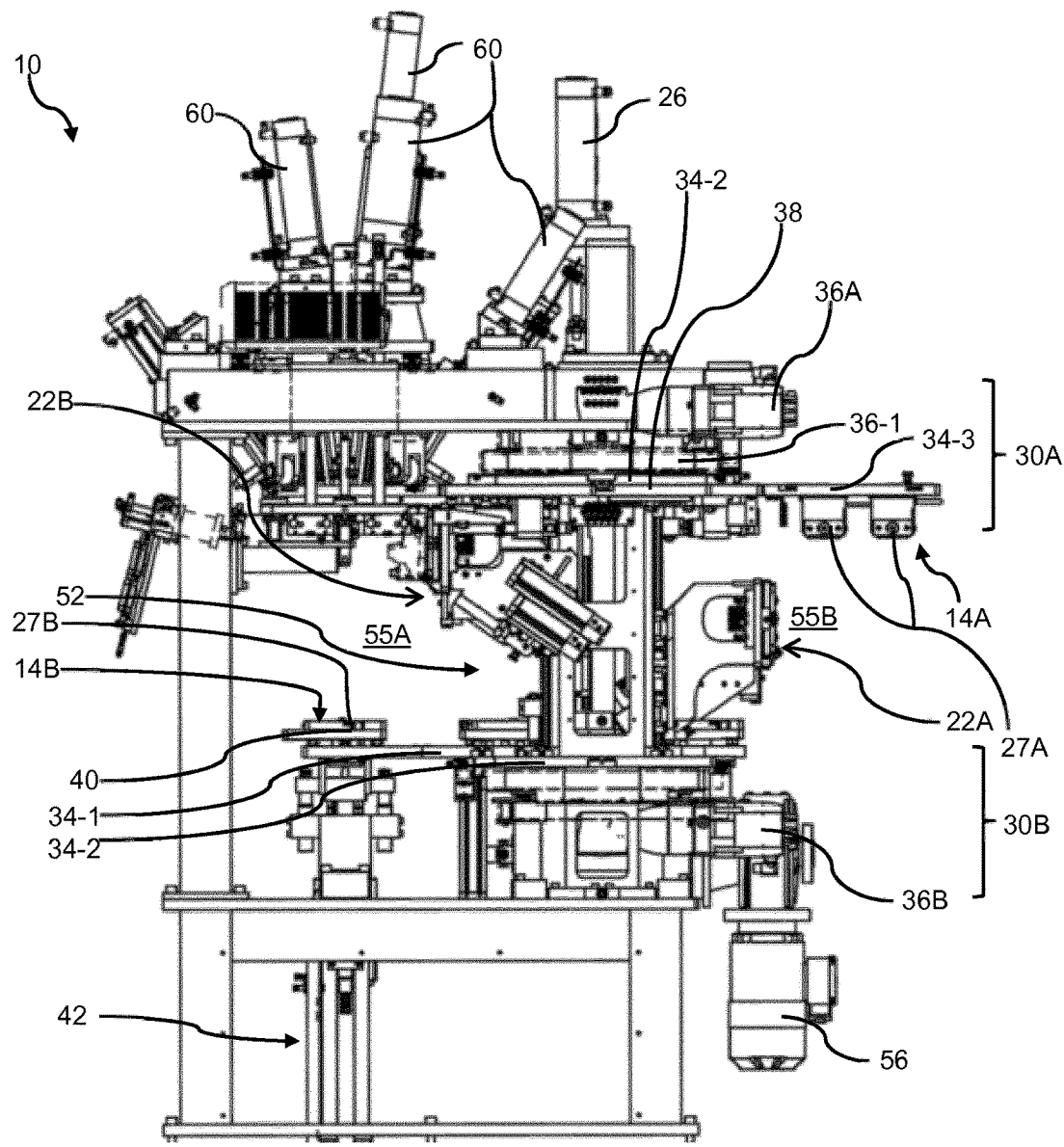
FIG. 2A is a side view of a leak testing machine according to the invention for cylinder heads.
Figure 2B:
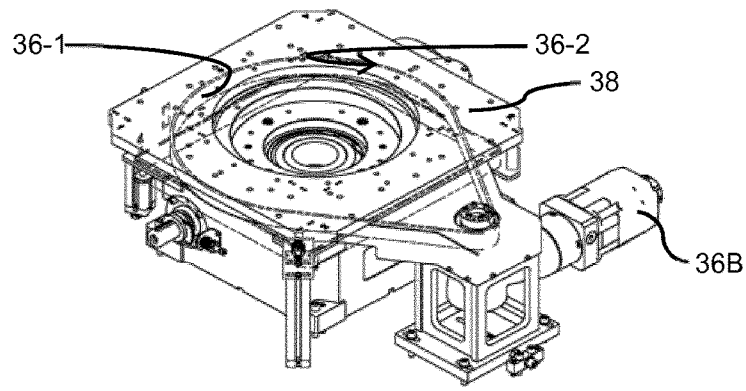
FIG. 2B is a perspective partial view of the lower changeover device from FIG. 2A for sealing plate changeover, for the purpose of illustrating the drive.
Figure 3:
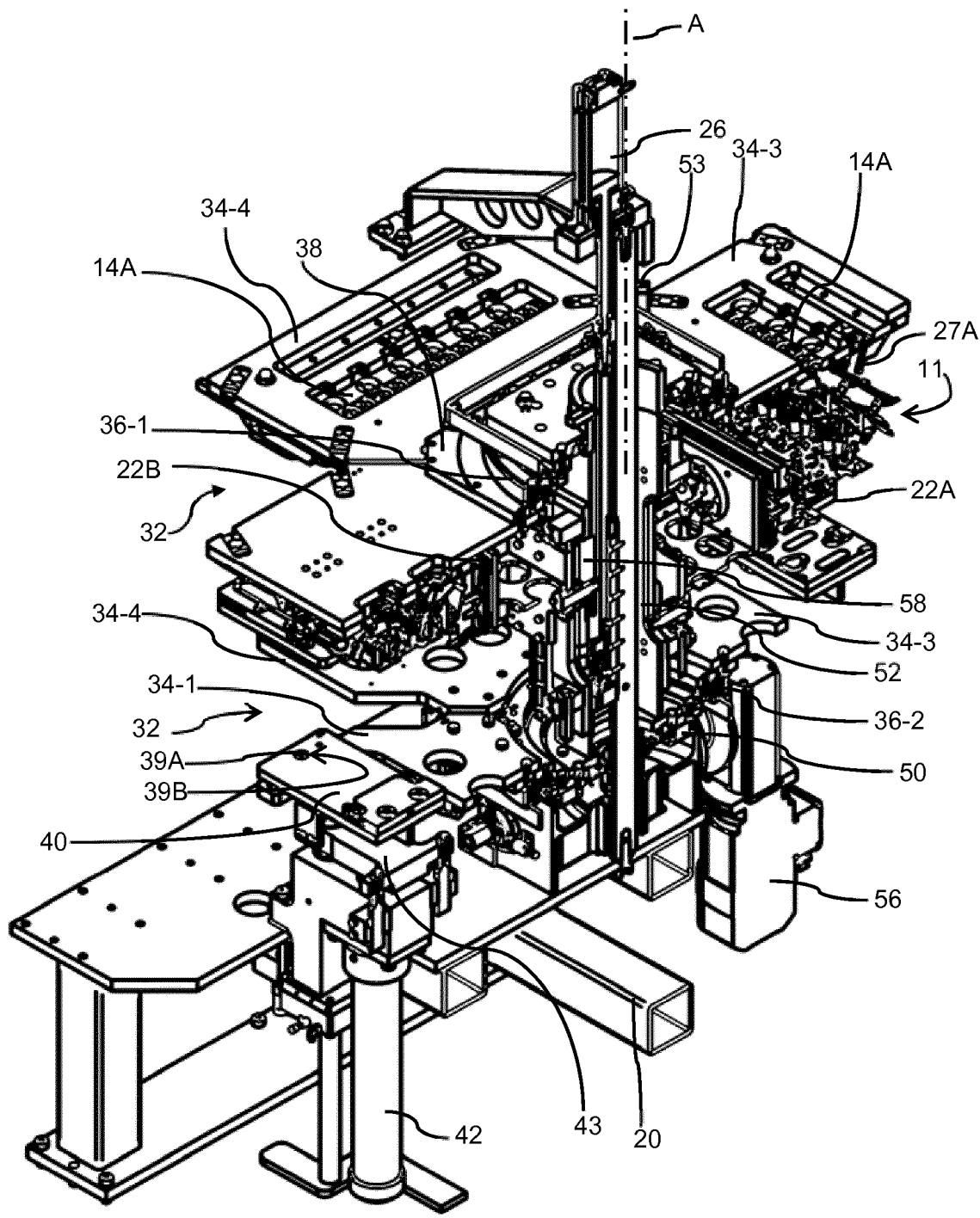
FIG. 3 is a perspective partial view, in vertical section, of a leak testing machine according to the invention for cylinder heads.
Figure 4:
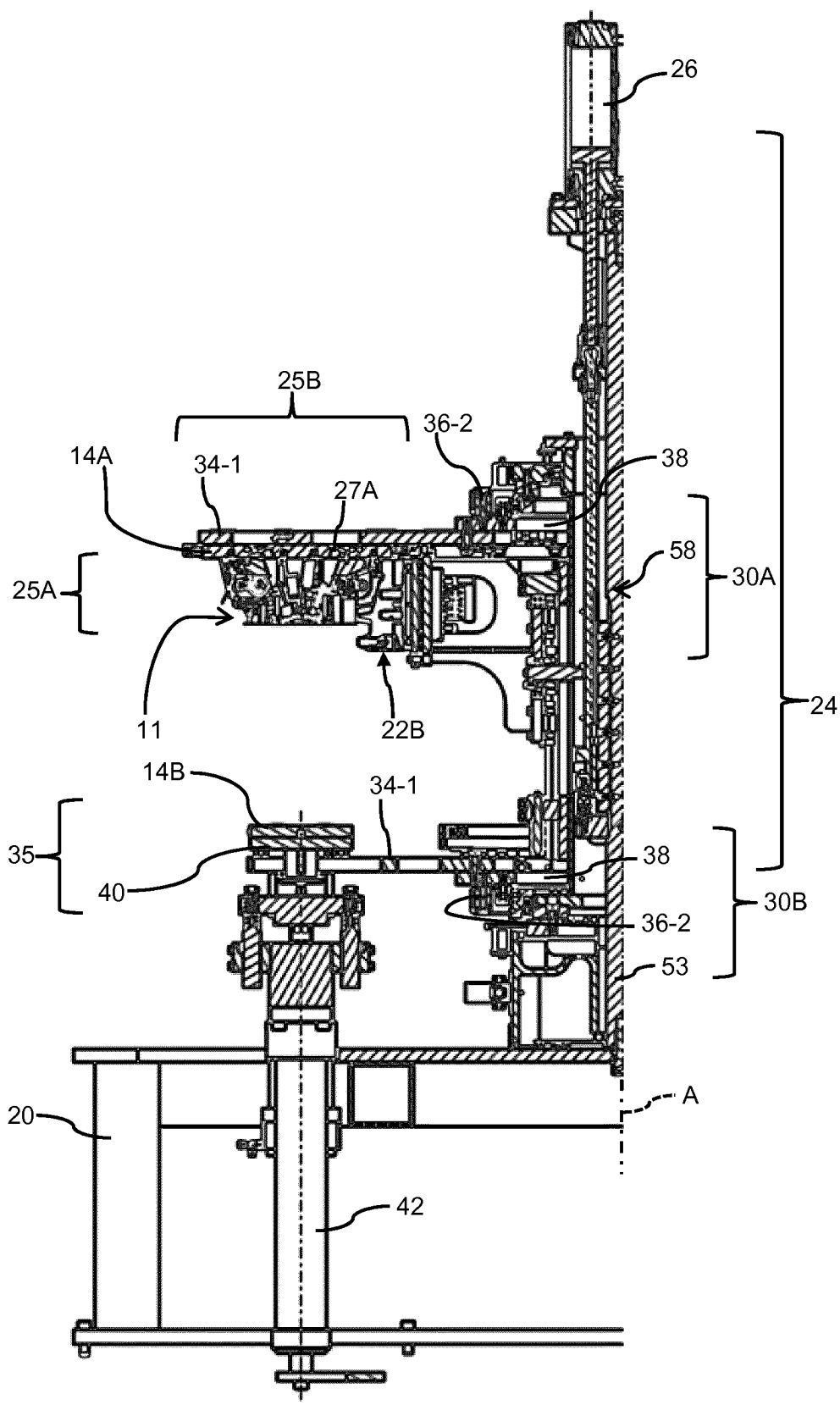
FIG. 4 is a partial view, in vertical half-section, of the leak testing machine of FIG. 3, in which a cylinder head lies against an upper sealing plate, before a lower sealing plate is advanced into the test position.

The exemplary embodiment according to FIGS. 2-4 relates purely by way of example to a flexible leak testing machine 10 which is suitable for tightness testing of different types of cylinder heads 11, for example for 3-cylinder, 4-cylinder and 6-cylinder modular inline engines.

The leak testing machine 10 has a machine frame 20 composed of multiple parts and having a floor frame for stationary fastening, for example to the factory floor. The machine frame 20 forms the reference point and (in mechanical engineering terms) the frame for all the mobile components of the leak testing machine 10. The leak testing machine 10 has two workpiece holding devices 22A, 22B each for one cylinder head 11, as is most clearly apparent from FIG. 2A.

The leak testing machine 10 has an adjusting device, designated overall with reference sign 24, with a pneumatic or hydraulic lifting cylinder (FIG. 2B) as drive 26 for bringing together the cylinder head 11 and one of a number of different upper sealing plates 14A into a test position 25A in which the cylinder head 11 may lie with its engine block-side first connection region tight against a sealing arrangement 27A of the upper sealing plate 14 (FIG. 4). The adjusting device 24 is embodied in FIGS. 2-4 as a vertical lifting device and a respective vertical linear guide 58 for each of the two workpiece holding devices 22A, 22B. The linear guide 58 is integrated in a vertically extending, column-like central bracket 52, for bringing, i.e. advancing, the cylinder head 11 with the respective workpiece holding devices 22A, 22B vertically out of a home position 55A into the test position 25A and vice versa. In this respect, the lifting cylinder 26 may optionally also be used to press the cylinder head 11 partially against the upper sealing plate 14A.

In the example according to FIGS. 2-4, the leak testing machine 10 furthermore has multiple different lower sealing plates 14B. Each of the lower sealing plates 14B is locked in place exchangeably for maintenance purposes on a vertically detachable sealing plate adapter 40. Using a further vertical lifting drive 42, here for example a double-acting hydraulic cylinder, of the adjusting device 24 and a holding claw 43 fastened to the output side thereof, the sealing plate adapter 40 is fed together with the lower sealing plate 14B by being advanced out of the bottommost idle position 35 shown in FIGS. 3-4 upwards against the cylinder head 11 and pressed or clamped thereagainst. In this case, the sealing arrangement 27B of the lower sealing plate 14B presses in gas-tight manner against the cover-side second connection region of the cylinder head 11. At the same time, sufficient contact force is generated to press the cylinder head 11 in gas-tight manner with its first connection region against the sealing arrangement 27A of the upper sealing plate 14A. In this gas-tight configuration (only shown in part) of the test position 25A, the cylinder head 11 is subjected to the leak test or tightness testing. In this case, the different internal or pressure chambers are selected using additional sealing plungers 60, which are introduced as appropriate and in automated manner through openings in the upper sealing plate 14A. Further lateral sealing plungers and/or smaller sealing plates not shown here are provided for sealing other openings of the internal chambers of the cylinder head 11 in a manner known per se.

For partly or fully automated exchange of the two sealing plates 14A, 14B used in the test position 25A, the leak testing machine 10 has two "sealing plate changers" or changeover devices 30A, 30B. The upper changeover device 30A and the lower changeover device 30B are here constructed largely according to the same principles and each comprise a holding arrangement 32 for a plurality of sealing plates 14A, 14B. In the example shown, each holding arrangement 32 has four holders 34-1-34-4, respectively for an associated sealing plate 14A, 14B, wherein the holders are adapted to the corresponding type of sealing plate 14A, 14B. Each holding arrangement 32 further comprises a quadrangular base plate 38 with square outline and a large passage opening for the central bracket 52. The holders 34-1-34-4 are each bolted on offset by 90° on each side of the base plate 38 and projecting radially relative to the vertical axis A. In the example shown, only the holders of the lower changeover device 30B have sealing plate adapters 40 for faster exchange and for interaction with the lifting drive 42. The downwardly directed upper sealing plates 14A may be directly bolted and secured on the holders of the upper changeover device 30A, or detachably attached (not shown) by means of corresponding adapters.

The holding arrangements 32 of both changeover devices 30A, 30B are each mounted on the machine frame 20 so as to be swivelable about the vertical axis A, in order to move each of the four upper sealing plates 14A and each of the four lower sealing plates 14B as appropriate, i.e. as a function of the workpiece to be tested, out of a waiting position into an operating position 25B in each case associated with the test position 25A (FIG. 4, right) and vice versa. For corresponding swiveling of the holding arrangement 32, each of the two changeover devices 30A, 30B has an electrical servomotor 36A, 36B, each of which drives, via a worm gear pair, an associated toothed belt 36-1 which engages in a ring gear 36-2 in each case mounted non-rotatably on the base plate 38, coaxially with the vertical axis A.

On actuation of the changeover devices 30A, 30B, which takes place via the system controller (cf. FIG. 1), the additional transversely or laterally acting sealing plungers 60 or smaller sealing plates are moved away into parked positions by suitable apparatuses and/or moved forwards again only after actuation.

To prevent operating errors, the holders 34-1-34-4 and sealing plates 14A of the upper changeover device 14A each have incorrect coupling prevention means, for example one-to-one position coding pins 39A and corresponding receptacles 39B. Corresponding incorrect coupling prevention means with matching coding pin(s) 39A and receptacle(s) 39B is provided on each sealing plate adapter 40 for the respective lower sealing plate 14B. Incorrect coupling prevention means may likewise also be provided for attachment of the sealing plate adapters 40 to the lower holders 34-1-34-4.

Finally, one further aspect will be described. According to one aspect relevant to the invention and usable completely independently of sealing plate exchange, in order to avoid delay during loading and unloading the leak testing machine 10 has a rotary indexing table 50 on the machine frame 20. The two workpiece holding devices 22A, 22B for the workpieces 11; 12 are provided indirectly on the rotary indexing table 50. The rotary indexing table 50 has at least one third drive 56, e.g. a servomotor with worm gear pair, as shown in FIGS. 3-4. The rotary indexing table 50 is rotatable about the vertical axis A, which is defined for example by an axial mast 53 attached to the machine frame 20. The rotary indexing table 50 bears the central bracket 52 with the workpiece holding devices 22A, 22B rotatably about the vertical axis A, namely in the manner of a hollow shaft. In this way, the workpiece holding devices 22A, 22B are exchangeable between the two positions shown in FIGS. 2-3 relative to one another by 180° rotation about the vertical axis A. The leak testing machine 10 may thus move the workpiece 11; 12 out of a loading position 55B for loading and unloading of the leak testing machine 10 into a home position 55A upstream of the test position 25A or directly into the test position 25A and vice versa. Testing and loading or unloading may therefore take place simultaneously, without loss of time.

In a preferred combination with changeover devices 30A, 30B and rotary indexing table 50, the supporting member 38 is mounted coaxially relative to the axis of rotation A of the rotary indexing table 50, i.e. on the axial mast 53 by means of rolling bearings. In this case, the supporting member 38 of the lower changeover devices 30B may be mounted swivelably (FIGS. 3-4) directly on the structure of the rotary indexing table 50 to save material.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A leak testing machine for tightness testing of a workpiece with at least one internal chamber to be tested, comprising:
at least one sealing plate with a sealing arrangement for a connection region of the workpiece;
a machine frame with at least one workpiece holding device for the workpiece; and
an adjusting device with at least one first drive for bringing together the workpiece and the sealing plate into a test position, in which the workpiece lies with the connection region tight against the sealing arrangement of the sealing plate;
a changeover device for sealing plate changeover, the changeover device comprising a holding arrangement and an associated second drive for sealing plate changeover, wherein the holding arrangement comprises a common supporting member, which is mounted swivelably adjustable on the machine frame, and at least two holders, each holding one sealing plate respectively on the machine frame, the at least two holders being provided on the common supporting member, wherein the associated second drive is capable of actuating the holding arrangement for sealing plate changeover by swiveling the common supporting member comprising the two holders; wherein
a rotary device is provided on the machine frame, the rotary device having the at least one workpiece holding device as well as an associated third drive, which is capable of actuating the rotary device for bringing the workpiece at least out of a loading position for loading and unloading the leak testing machine into either a home position upstream of the test position or the test position, and vice versa.

2. The leak testing machine as claimed in claim 1, wherein the workpiece is a cylinder head or an engine block.

3. The leak testing machine as claimed in claim 1, wherein the associated second drive for sealing plate changeover is for bringing a holder with the sealing plate out of a waiting position into an operating position associated with the test position and vice versa.

4. The leak testing machine as claimed in claim 1, wherein the supporting member is mounted swivelably about a vertical axis on the machine frame, such that a sealing plate on a corresponding holder is transferred by swiveling about the axis into the operating position or brought out of the operating position.

5. The leak testing machine as claimed in claim 1, wherein the rotary device comprises a rotary indexing table for bringing the workpiece by indexed rotary motion out of a loading position for loading and unloading the leak testing machine into either a home position upstream of the test position or into the test position and vice versa.

6. The leak testing machine as claimed in claim 5, wherein the holding arrangement is swivelably mounted coaxially with the axis of rotation of the rotary indexing table and/or on the rotary indexing table.

7. The leak testing machine as claimed in claim 6, wherein the supporting member is swivelably mounted coaxially with the axis of rotation of the rotary indexing table and/or on the rotary indexing table.

8. The leak testing machine as claimed in claim 6, wherein the rotary indexing table has a vertical axis of rotation and a vertical central bracket rotatable thereabout and actuated by the third drive and having at least two opposing workpiece holding devices.

9. The leak testing machine as claimed in claim 1, wherein the adjusting device in the form of a vertical lifting device has a vertical linear guide for each workpiece holding device and has a first drive a lifting drive for moving a workpiece holding device with the workpiece from a home position into the test position and/or for pressing the workpiece against a sealing plate.

10. The leak testing machine as claimed in claim 9, wherein the vertical lifting device has a vertical linear guide for each workpiece holding device on the central bracket.

11. The leak testing machine as claimed in claim 9, wherein a second changeover device comprises a further holding arrangement mounted adjustably on the machine frame and having at least two holders for one sealing plate respectively and having an associated drive for bringing a holder with sealing plate out of a waiting position into an operating position associated with the test position and vice versa.

12. The leak testing machine as claimed in claim 11, wherein the first changeover device is arranged on the machine frame above the workpiece holding device and the second changeover device is arranged on the machine frame below the workpiece holding device.

13. The leak testing machine as claimed in claim 1, wherein each holder has a sealing plate adapter, with which the sealing plate is attached detachably to the holder, wherein each sealing plate adapter interacts with the adjusting device to move a sealing plate on the sealing plate adapter out of the operating position into the test position and/or to press the sealing plate against the workpiece.

14. The leak testing machine as claimed in claim 13, wherein the adjusting drive has a further lifting drive to move a sealing plate on the sealing plate adapter out of the operating position into the test position and/or to press the sealing plate against the workpiece.

15. The leak testing machine as claimed in claim 1, wherein the leak testing machine comprises a set with two sealing plates for one workpiece type to be tested and has two changeover devices for the sealing plates.

16. The system as claimed in claim 15, wherein the system has a computer-assisted measuring device for measuring differential pressure or volumetric flow rate as a testing device for the automated tightness testing, wherein the controller is connected to the measuring device for tightness testing.

17. The leak testing machine as claimed in claim 1, wherein the changeover device comprises at least two different sealing plates corresponding to two workpiece types; and/or
each holder has an incorrect coupling prevention means matching precisely one sealing plate type.

18. The leak testing machine as claimed in claim 17, wherein the coupling prevention means includes a locking safeguard interacting with a sealing plate adapter.

19. The lead testing machine as claimed in claim 18, wherein the locking safeguard includes a coding pin/receptacle combination.

20. The leak testing machine as claimed in claim 1, further comprising a sealing plunger advanceable transversely of the workpiece for further openings to the internal chamber of the workpiece, which plunger is movable out of the travel area of the changeover device.

21. A system for partly or fully automated tightness testing for industrially produced workpieces with an internal chamber to be tested, comprising:
at least one leak testing machine comprising
a machine frame with at least one workpiece holding device for the workpiece;
an adjusting device with at least one first drive for bringing together the workpiece and a sealing plate, which has a sealing arrangement for a connection region of the workpiece, into a test position, in which the workpiece lies with the connection region tight against the sealing arrangement of the sealing plate; and
a changeover device for sealing plate changeover, the changeover device comprising a holding arrangement for at least two sealing plates and comprising an associated second drive for sealing plate changeover, wherein the holding arrangement comprises a common supporting member, which is swivelably adjustable on the machine frame, and at least two sealing plate holders, each sealing plate holder being configured for holding one sealing plate respectively, the at least two sealing plate holders being provided on the common supporting member, wherein the associated second drive is capable of actuating the holding arrangement for sealing plate changeover by swiveling the common supporting member comprising the two sealing plate holders; wherein a rotary device is provided on the machine frame, the rotary device having the at least one workpiece holding device as well as an associated third drive, which is capable of actuating the rotary device for bringing the workpiece at least out of a loading position for loading and unloading the leak testing machine into at least an operating position associated with the test position, and vice versa; and
a controller, which controls the changeover device to bring a sealing plate respectively matching the workpiece automatically into the operating position.

22. The system as claimed in claim 21, wherein the changeover device includes an associated fourth drive for bringing a holder with a sealing plate out of a waiting position into the operating position associated with the test position and vice versa.

23. The system as claimed in claim 21, wherein the controller is connected with a recognition device for recognizing the type of the workpiece to be loaded and controls the changeover device accordingly and brings the matching sealing plate automatically into the operating position.

24. The system as claimed in claim 21, wherein the system has an industrial robot for automatic workpiece handling, wherein the controller is connected to the industrial robot for workpiece handling.

25. The system as claimed in claim 24, wherein the automatic workpiece handling includes loading and unloading the workpiece holding device(s) with a workpiece.

26. A method of testing for leaks comprising the step of providing a leak testing machine as claimed in claim 1 or a system as claimed in claim 21 for tightness testing of an industrially produced workpiece with an internal chamber to be tested.

27. A leak testing machine for tightness testing of a cylinder head, an engine block or a crankcase for an internal combustion engine, comprising:
at first sealing plate with a sealing arrangement for a connection region of a first workpiece;
at second sealing plate with a sealing arrangement for a connection region of a second workpiece;
a machine frame with at least one workpiece holding device for the workpiece; and
an adjusting device with at least one first drive for bringing together the workpiece and one of the first or the second sealing plate into a test position, in which the workpiece lies with the connection region tight against the sealing arrangement of the sealing plate;
a changeover device for sealing plate changeover, the changeover device comprising a holding arrangement that holds the first sealing plate on the machine frame and the second sealing plate on the machine frame, the changeover device comprising an associated second drive for sealing plate changeover by actuating the holding arrangement;
a rotary indexing table provided on the machine frame, the rotary indexing table having the at least one workpiece holding device as well as an associated drive for bringing the workpiece out of a loading position for loading and unloading the leak testing machine into an operating position and vice versa;
the changeover device and the rotary indexing table being arranged so that the changeover device is capable of changeover of sealing plates at the same time as the rotary indexing table exchanges workpieces.

28. The leak testing machine as claimed in claim 27, further comprising a changeover device for sealing plates with a holding arrangement adjustable on the machine frame, comprising at least two holders for one sealing plate, and with an associated drive for sealing plate changeover, wherein the holding arrangement is mounted swivelably on the rotary indexing table coaxially with the axis of rotation thereof.

29. A method of testing for leaks comprising the step of providing a leak testing machine as claimed in claim 28, wherein the workpiece is a cylinder head or an engine block.

* * * * *